(12) United States Patent
Wang et al.

(10) Patent No.: US 10,627,668 B2
(45) Date of Patent: Apr. 21, 2020

(54) ANTI-PEEPING DEVICE, METHOD OF CONTROLLING THE SAME AND DISPLAY DEVICE

(71) Applicant: BOE Technology Group Co., Ltd., Beijing (CN)

(72) Inventors: Yingtao Wang, Beijing (CN); Ming Zhu, Beijing (CN); Zheng Fang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 158 days.

(21) Appl. No.: 16/012,491

(22) Filed: Jun. 19, 2018

(65) Prior Publication Data

US 2019/0204675 A1    Jul. 4, 2019

(30) Foreign Application Priority Data

Jan. 2, 2018  (CN) .......................... 2018 1 0003140

(51) Int. Cl.
| | | |
|---|---|---|
| *G02F 1/1335* | (2006.01) | |
| *G06F 21/82* | (2013.01) | |
| *G02B 27/28* | (2006.01) | |
| *G06F 21/84* | (2013.01) | |
| *G02B 5/30* | (2006.01) | |

(52) U.S. Cl.
CPC ..... *G02F 1/133528* (2013.01); *G02B 5/3058* (2013.01); *G02B 5/3083* (2013.01); *G02B 27/281* (2013.01); *G02F 1/133512* (2013.01); *G06F 21/82* (2013.01); *G06F 21/84* (2013.01); *G09G 2358/00* (2013.01)

(58) Field of Classification Search
CPC .... G02B 5/3058; G02B 5/3083; G02B 27/21; G02F 1/133528; G02F 21/82; G02F 21/84
USPC ............. 359/485.05, 487.03, 489.07; 349/96
See application file for complete search history.

(56) References Cited

U.S. PATENT DOCUMENTS

| | | | |
|---|---|---|---|
| 8,081,273 B2* | 12/2011 | Choo ................ | G02F 1/133536 349/100 |
| 10,388,234 B2* | 8/2019 | Zhang .................. | G09G 3/3607 |
| 10,437,099 B2* | 10/2019 | Wang .................. | G02B 6/0031 |
| 2012/0075562 A1* | 3/2012 | Yeh ....................... | G02F 1/1323 349/139 |
| 2014/0355115 A1* | 12/2014 | Wu ....................... | G02B 5/3083 359/489.07 |
| 2018/0059450 A1* | 3/2018 | Li ......................... | G02F 1/1337 |

(Continued)

*Primary Examiner* — Ricky D Shafer
(74) *Attorney, Agent, or Firm* — McDermott Will & Emery LLP

(57) ABSTRACT

Provided is an anti-peeping device including: a first substrate; a second substrate opposite to the first substrate; a liquid crystal layer between the first substrate and the second substrate; a plurality of first polarizers on the first substrate and being spaced apart from each other; and a second polarizer on the second substrate. Linearly polarized light emitted from the second polarizer is incident onto the plurality of first polarizers through liquid crystal molecules in at least a portion of the liquid crystal layer. The anti-peeping device is switched between a first state and a second state in response to a deflection state of the liquid crystal molecules, wherein the linearly polarized light passes though the plurality of first polarizers in the first state, and the linearly polarized light is blocked by the plurality of first polarizers in the second state.

20 Claims, 6 Drawing Sheets

(56) References Cited

U.S. PATENT DOCUMENTS

2019/0129274 A1\* 5/2019 Wang .................... G02B 6/0068
2019/0258120 A1\* 8/2019 You .................... G02F 1/134309

\* cited by examiner

ANTI-PEEPING DEVICE, METHOD OF CONTROLLING THE SAME AND DISPLAY DEVICE

CROSS-REFERENCE TO RELATED APPLICATION

This application claims priority to Chinese Patent Application No. 201810003140.2 filed on Jan. 2, 2018 in the State Intellectual Property Office of China, the disclosure of which is hereby incorporated by reference in its entirety.

TECHNICAL FIELD

The present disclosure relates to the field of display technology, more particularly, to an anti-peeping device, a method of controlling an anti-peeping device and a display device.

DESCRIPTION OF THE RELATED ART

With the development of technology, various types of electronic devices, such as mobile phones, computers, and televisions, more and more closely bonded into people's life and work. However, while electronic devices provide people with many conveniences, they may also bring about leakage of personal information. For example, taking an existing display device as an example, the existing display device generally has a relatively large viewing angle, this is a great advantage for public display, however, this is a disadvantage for security of personal information.

SUMMARY

In an aspect, it is provided an anti-peeping device including: a first substrate; a second substrate opposite to the first substrate; a liquid crystal layer between the first substrate and the second substrate; a plurality of first polarizers on the first substrate, the plurality of first polarizers being spaced apart from each other; and a second polarizer on the second substrate, wherein linearly polarized light emitted from the second polarizer is incident onto the plurality of first polarizers through liquid crystal molecules in at least a portion of the liquid crystal layer and, and wherein the plurality of first polarizers, the liquid crystal layer and the second polarizer cooperate with each other, so that the anti-peeping device is switched between a first state and a second state in response to a deflection state of the liquid crystal molecules, wherein the linearly polarized light incident onto the plurality of first polarizers through the liquid crystal molecules passes though the plurality of first polarizers in the first state, and the linearly polarized light incident onto the plurality of first polarizers through the liquid crystal molecules is blocked by the plurality of first polarizers in the second state.

Optionally, a direction of a transmission axis of each of the plurality of first polarizers is different from a direction of a transmission axis of the second polarizer.

Optionally, the direction of the transmission axis of each of the plurality of first polarizers is orthogonal to the direction of the transmission axis of the second polarizer.

Optionally, in a state where the liquid crystal molecules are undeflected, the linearly polarized light incident onto the plurality of first polarizers through the liquid crystal molecules is blocked by the plurality of first polarizers; and in a state where the liquid crystal molecules are applied by voltage and deflected, the linearly polarized light incident onto the plurality of first polarizers through the liquid crystal molecules passes though the plurality of first polarizers.

Optionally, a direction of a transmission axis of each of the plurality of first polarizers is the same as a direction of a transmission axis of the second polarizer.

Optionally, in a state where the liquid crystal molecules are undeflected, the linearly polarized light incident onto the plurality of first polarizers through the liquid crystal molecules passes though the plurality of first polarizers; and in a state where the liquid crystal molecules are applied by voltage and deflected, the linearly polarized light incident onto the plurality of first polarizers through the liquid crystal molecules is blocked by the plurality of first polarizers.

Optionally, the first polarizers include metal wire grid polarizers.

Optionally, an orthogonal projection of the at least a portion of the liquid crystal layer on the first substrate coincides with an orthogonal projection of the plurality of first polarizers on the first substrate.

Optionally, a width of each one of the plurality of first polarizers in a direction parallel to the first substrate is W, and a distance between the first substrate and the second substrate in a direction perpendicular to the first substrate is d, the width W and the distance d satisfy a following relationship: $W > d \times \tan\theta$, wherein $\theta$ is a critical angle at which a total reflection occurs at an interface when the linearly polarized light is incident on the first substrate through the liquid crystal molecules.

Optionally, the anti-peeping device may further include: an insulating layer on the first substrate, the insulating layer covering the plurality of first polarizers; a plurality of first electrodes on the insulating layer, an orthogonal projection of the plurality of first electrodes on the first substrate coinciding with an orthogonal projection of the plurality of first polarizers on the first substrate; and a plurality of second electrodes on the second substrate, the orthogonal projection of the plurality of first electrodes on the first substrate coinciding with an orthogonal projection of the plurality of second electrodes on the first substrate.

Optionally, the second polarizer includes a plurality of metal wire grid polarizers.

Optionally, the second polarizer includes a plurality of second sub-polarizers spaced apart from each other, and an orthogonal projection of the plurality of second sub-polarizers on the first substrate coincides with an orthogonal projection of the plurality of first polarizers on the first substrate.

In another aspect, it is provided a display device including: a backlight source; a liquid crystal display panel; and the anti-peeping device as described above, on a side of the backlight source facing the liquid crystal display panel.

Optionally, the anti-peeping device is located between the backlight source and the liquid crystal display panel.

Optionally, the display device may further include a quarter-wave plate between the liquid crystal display panel and the anti-peeping device.

Optionally, the anti-peeping device is located on a side of the liquid crystal display panel facing away from the backlight source, a polarization direction of linearly polarized light emitted from the liquid crystal display panel is the same as a direction of a transmission axis of the second polarizer of the anti-peeping device.

In a further aspect, it is provided a display device including: an OLED display panel, and the anti-peeping device as described above, in a light path of light emitted from the OLED display panel.

In another further aspect, it is provided a method of controlling an anti-peeping device, the anti-peeping device including a plurality of first polarizers spaced apart from each other; a second polarizer opposite to the plurality of first polarizers; and a liquid crystal layer between the plurality of first polarizers and the second polarizer, wherein the method includes: providing linearly polarized light emitted from the second polarizer; controlling the linearly polarized light to be incident onto the plurality of first polarizers through liquid crystal molecules in at least a portion of the liquid crystal layer and; and controlling a deflection state of the liquid crystal molecules so that the anti-peeping device is switched between a first state and a second state, wherein in the first state, the linearly polarized light incident onto the plurality of first polarizers through the liquid crystal molecules passes though the plurality of first polarizers, and in the second state, the linearly polarized light incident onto the plurality of first polarizers through the liquid crystal molecules is blocked by the plurality of first polarizers.

Optionally, the controlling a deflection state of the liquid crystal molecules so that the anti-peeping device is switched between a first state and a second state includes: controlling the liquid crystal molecules to be in an undeflected state, so that the linearly polarized light incident onto the plurality of first polarizers through the liquid crystal molecules is blocked by the plurality of first polarizers, thereby switching the anti-peeping device into the second state; and controlling the liquid crystal molecules to be in a deflected state with applied voltage, so that the linearly polarized light incident onto the plurality of first polarizers through the liquid crystal molecules passes though the plurality of first polarizers, thereby switching the anti-peeping device into the first state.

Optionally, the controlling a deflection state of the liquid crystal molecules so that the anti-peeping device is switched between a first state and a second state includes: controlling the liquid crystal molecules to be in an undeflected state, so that the linearly polarized light incident onto the plurality of first polarizers through the liquid crystal molecules passes though the plurality of first polarizers, thereby switching the anti-peeping device into the first state; and controlling the liquid crystal molecules to be in a deflected state with applied voltage, so that the linearly polarized light incident onto the plurality of first polarizers through the liquid crystal molecules is blocked by the plurality of first polarizers, thereby switching the anti-peeping device into the second state.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Specific embodiments of the present disclosure will be further described in detail below in conjunction with the accompanying drawings.

DETAILED DESCRIPTION OF PREFERRED EMBODIMENTS

Figure 1:
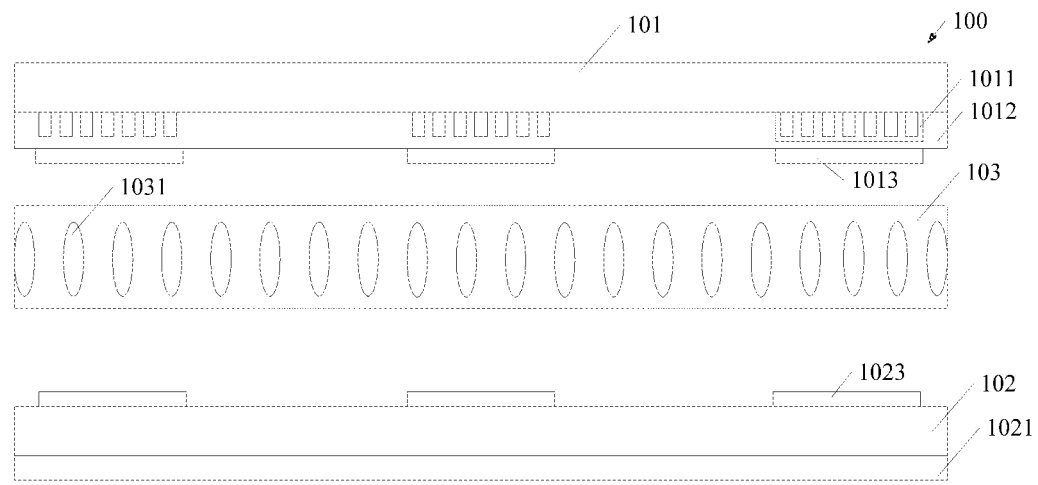
FIG. 1 is a schematic view of an anti-peeping device according to an embodiment of the present disclosure.

In order to illustrate the present disclosure more clearly, the disclosure will be further described below in conjunction with embodiments and the accompanying drawings. Like parts in the drawings are denoted by the same reference numeral. It should be understood by those skilled in the art that the following detailed description is illustrative rather than restrictive, and should not limit the scope of the present disclosure.

In the related art, in general anti-peeping display technology, a louver-type anti-peeping device is added on a display screen or an anti-peeping device having a black matrix is added in a display device so as to reduce the viewing angle, thereby achieving the anti-peeping effect. However, such louver-type anti-peeping device need to additionally install the anti-peeping device outside the display screen, and the anti-peeping device has to be manually removed while anti-peeping is not needed, thus it is inconvenient to use. Similarly, the anti-peeping device having a black matrix may not be switched freely between an anti-peeping display of narrow viewing angle and a normal display of wide viewing angle. Additional optical devices need to be added in order to realize the switch, resulting in complicated structure and high cost.

Figure 2:
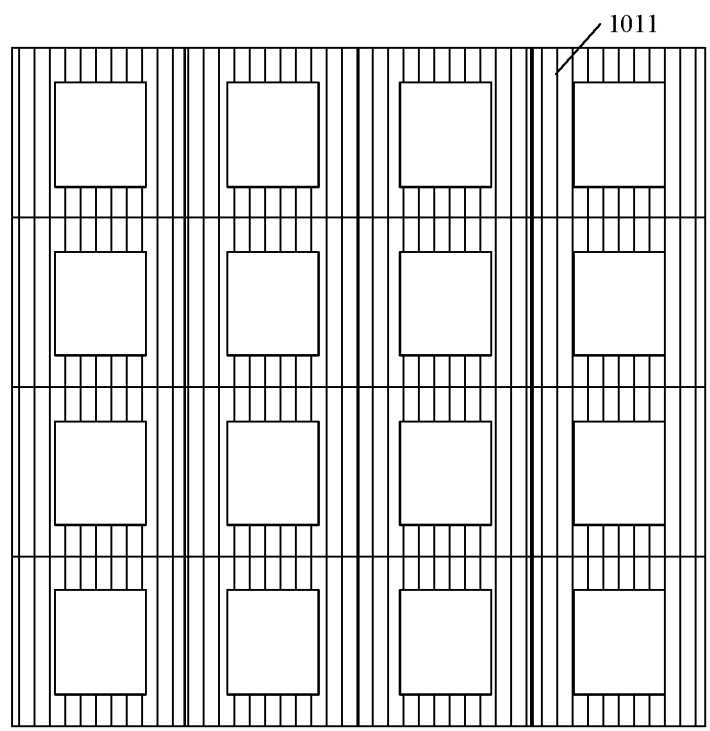
FIG. 2 is a plan view illustrating an area, where first polarizers of an anti-peeping device according to an embodiment of the present disclosure are located.

As shown in FIG. 1 and FIG. 2, an embodiment of the present disclosure provides an anti-peeping device 100. The anti-peeping device 100 includes a first substrate 101, a second substrate 102 and a liquid crystal layer 103 between the first substrate 101 and the second substrate 102. The anti-peeping device 100 further includes a plurality of first polarizers 1011 spaced apart from each other on the first substrate 101 and a second polarizer 1021 provided on the second substrate 102, as shown in FIG. 1.

According to an exemplary embodiment of the present disclosure, the first polarizer 1011 may be a wire grid polarizer. Wire grid polarizers are more easily spaced apart from each other, or more easily patterned. According to the exemplary embodiment of the present disclosure, the second polarizer 1021 may be a polarizer which does not have spaced portions, that is, it may be a monolithic polarizer.

According to the exemplary embodiment of the present disclosure, a direction of a transmission axis of each of the first polarizers 1011 may be different from a direction of a transmission axis of the second polarizer 1021. As shown in FIG. 1, an orthogonal projection of at least a portion of the liquid crystal layer 103 on the first substrate 101 coincides with an orthogonal projection of the plurality of first polarizers 1011 on the first substrate 101. For convenience of description, the at least a portion of the liquid crystal layer 103 is expressed as a first portion of the liquid crystal layer 103. When a voltage is applied to the liquid crystal layer 103, liquid crystal molecules 1031 located in the first portion of the liquid crystal layer 103 are deflected so that a polarization direction of linearly polarized light emitted from the second polarizer 1021 is deflected while the linearly polarized light is passing through the liquid crystal molecules 1031. In this way, the linearly polarized light deflected by the liquid crystal molecules 1031 is able to pass through the first polarizers 1011.

The operation of the anti-peeping device 100 according to the embodiment of the present disclosure is further described with reference to FIGS. 3 and 4 as follow.

Figure 3:
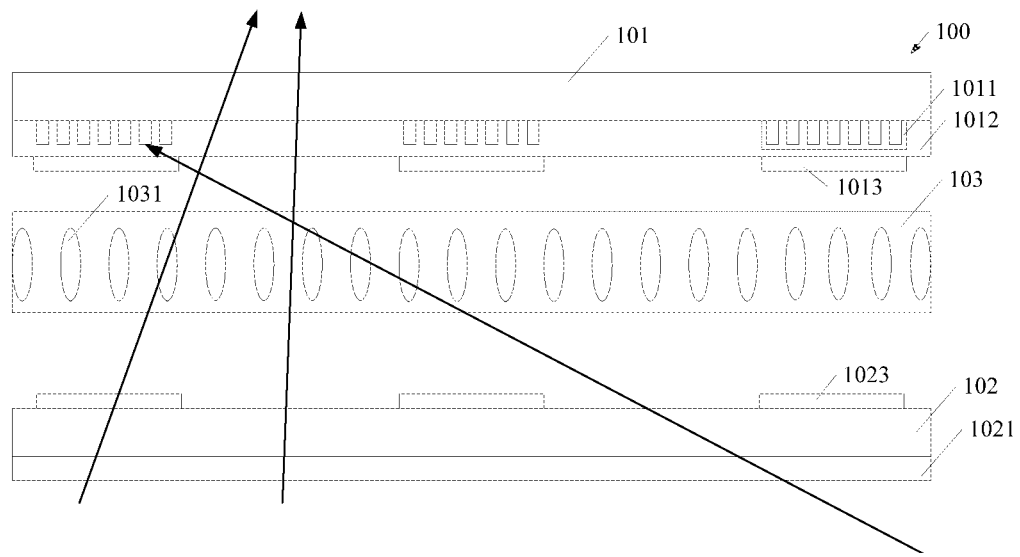
FIG. 3 is a schematic view illustrating an anti-peeping device according to an embodiment of the present disclosure in a state in which no voltage is applied to a liquid crystal layer.

As shown in FIG. 3, when no voltage is applied to the liquid crystal molecules 1031 located in the first portion of the liquid crystal layer 103, since the direction of the transmission axis of each of the first polarizers 1011 is different from the direction of the transmission axis of the second polarizer 1021, the linearly polarized light passing through the second polarizer 1021 is not capable of passing through the first polarizers 1011, so that light of a large emergent angle is blocked, and the anti-peeping display of narrow viewing angle may be realized.

Figure 4:
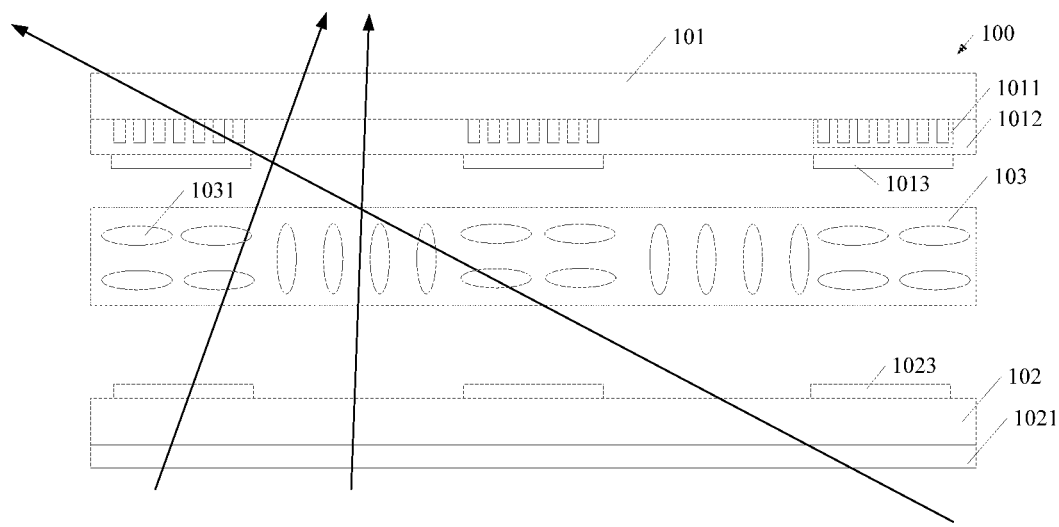
FIG. 4 is a schematic view illustrating an anti-peeping device according to an embodiment of the present disclosure in a state in which a voltage is applied to a liquid crystal layer.

As shown in FIG. 4, when a voltage is applied to the liquid crystal molecules 1031 located in the first portion of the liquid crystal layer 103, the liquid crystal molecules 1031 located in the first portion of the liquid crystal layer 103 are deflected under the action of the voltage so that the polarization direction of the linearly polarized light emitted from the second polarizer 1021 is deflected after the linearly polarized light passes through the liquid crystal molecules 1031. In this way, the linearly polarized light deflected by the liquid crystal molecules 1031 is able to pass through the first polarizers 1011. That is, the liquid crystal molecules 1031 in a portion of the liquid crystal layer 103 corresponding to the first polarizers 1011 are deflected under the action of the voltage, so that the polarization direction of the linearly polarized light emitted from the second polarizer 1021 and passing through the liquid crystal molecules 1031 is deflected, thus the linearly polarized light whose polarization direction is deflected is able to pass through the first polarizers 1011. Therefore, in this case, light of a large emergent angle is not blocked by the first polarizers 1011, and the normal display of wide viewing angle can be realized.

In the embodiment, the direction of the transmission axis of each of the first polarizers 1011 is different from the direction of the transmission axis of the second polarizer 1021, and the plurality of first polarizers 1011, the liquid crystal layer 103 and the second polarizer 1021 cooperate with each other, so that the anti-peeping device may be switched between a state (which may be named as "normal display state of wide viewing angle") in which the linearly polarized light emitted from the liquid crystal molecules 1031 is allowed to pass through the plurality of first polarizers 1011 and a state (which may be named as "anti-peeping display state of narrow viewing angle") in which the linearly polarized light emitted from the liquid crystal molecules 1031 is prevented from passing through the plurality of first polarizers 1011 (that is, blocked by the plurality of first polarizers 1011), in response to a deflection state of the liquid crystal molecules 1031. Thus, the anti-peeping device may be switched between the anti-peeping display state of narrow viewing angle and the normal display state of wide viewing angle. Therefore, the anti-peeping device 100 provided by the present embodiment may be easily, accurately, and real-timely switched between the anti-peeping display state of narrow viewing angle and the normal display state of wide viewing angle by controlling the voltage applied to the liquid crystal molecules.

For example, the direction of the transmission axis of the first polarizers 1011 and the direction of the transmission axis of the second polarizer 1021 may be orthogonal to each other. In this way, better anti-peeping effect can be achieved and the control of liquid crystal molecules is easier.

In the embodiment of the present disclosure, both the first substrate 101 and the second substrate 102 may be transparent substrates, such as transparent glass substrates.

Referring to FIG. 2, an interval region between any two adjacent first polarizers 1011 forms a light-transmitting region surrounded by the first polarizers 1011. The light-transmitting region allows the linearly polarized light incident onto the light-transmitting region through the liquid crystal molecules in the liquid crystal layer 103 to pass though the light-transmitting region.

A shape of interval region is not limited in the embodiment of the present disclosure. For example, the interval region may be in a shape of a rectangle, a circle, a triangle, or the like.

Figure 5:
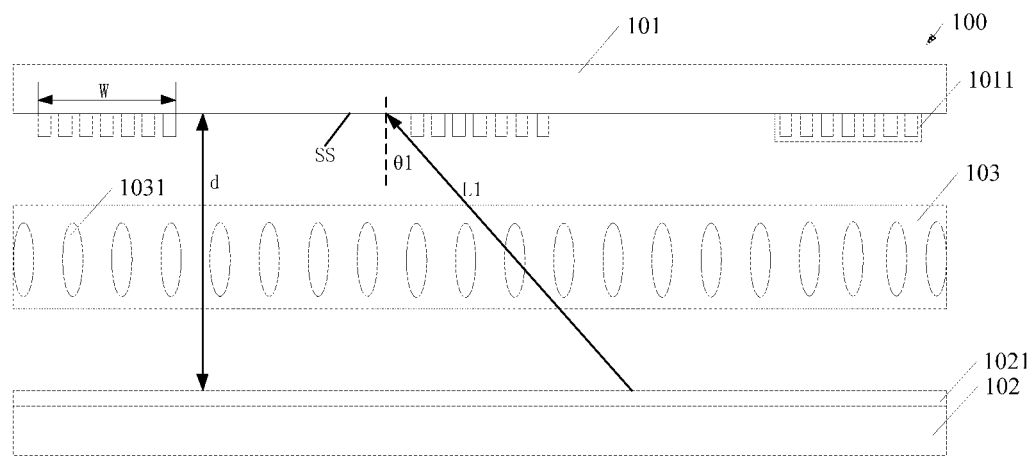
FIG. 5 is a schematic view illustrating a relationship between a width of one first polarizer and a height of a gap between two substrates in an anti-peeping device according to an embodiment of the present disclosure.

Referring to FIG. 5, a width of one first polarizer 1011 in a direction parallel to the first substrate 101 (i.e., a distance between two adjacent interval regions) is W. A gap is formed between the first substrate 101 and the second substrate 102, and a distance between the first substrate 101 and the second substrate 102 in a direction perpendicular to the first substrate 101 is d, and the width W and the distance d satisfy the following relationship: $W > d \times \tan\theta$, Here, $\theta$ is a critical angle at which a total reflection occurs at an interface when the polarized light is incident onto the first substrate 101 through the liquid crystal molecules in the liquid crystal layer 103. For example, the interface may be indicated by the reference symbol SS in FIG. 5, and the critical angle $\theta$ may be about 42°.

With this arrangement, when the linearly polarized light emitted from the liquid crystal molecules in the liquid crystal layer 103 is incident on an adjacent interval region, as indicated by a light ray L1 shown in FIG. 5, since the width W and the distance d satisfy the above relationship, an angle of incidence $\theta_1$ of the light ray L1 is greater than the critical angle θ, resulting in a total reflection of the light ray L1 at the interface SS. That is, the linearly polarized light emitted from the liquid crystal molecules in the liquid crystal layer 103 may not be emitted from the adjacent interval region, thereby further improving the anti-peeping display effect of narrow viewing angle.

In an alternative embodiment, the direction of the transmission axis of each of the first polarizers 1011 may be the same as the direction of the transmission axis of the second polarizer 1021.

Figure 6:
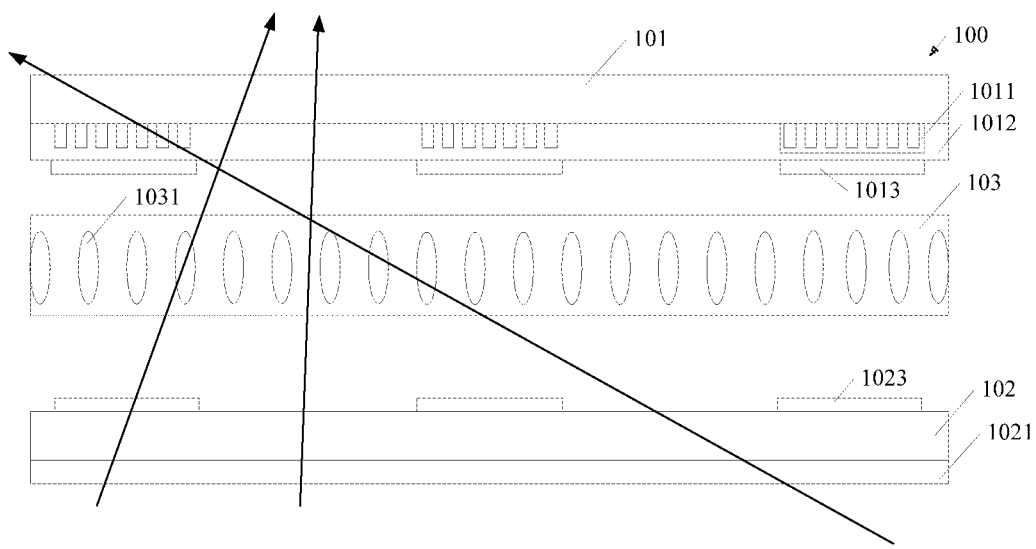
FIG. 6 is a schematic view illustrating an anti-peeping device according to another embodiment of the present disclosure in a state in which no voltage is applied to a liquid crystal layer.

As shown in FIG. 6, when no voltage is applied to the liquid crystal molecules 1031 in the first portion of the liquid crystal layer 103, since the direction of the transmission axis of each of the first polarizers 1011 is the same as the direction of the transmission axis of the second polarizer 1021, the linearly polarized light passing through the second polarizer 1021 is capable of passing through the first polarizers 1011. Therefore, in this case, emergent light of a large angle is not blocked by the first polarizers, and the normal display of wide viewing angle can be realized.

Figure 7:
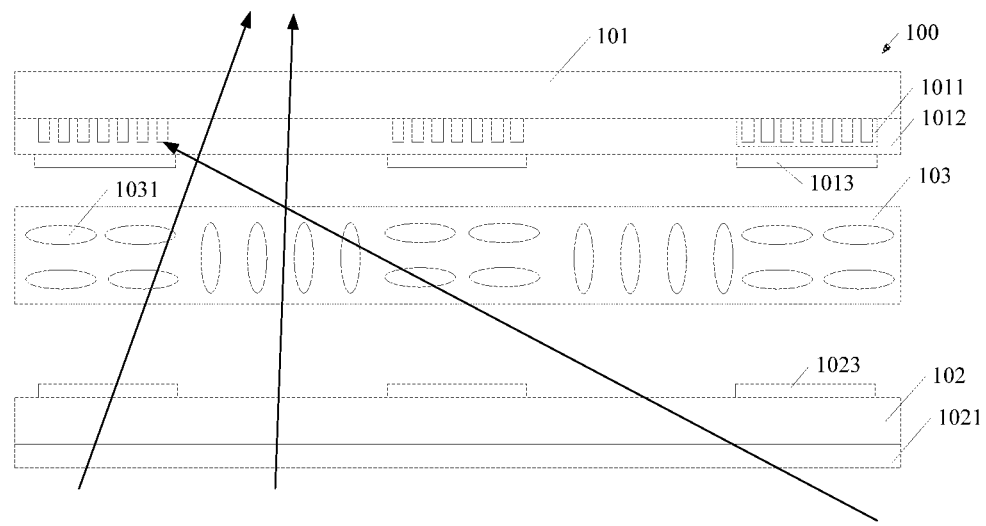
FIG. 7 is a schematic view illustrating an anti-peeping device according to another embodiment of the present disclosure in a state in which a voltage is applied to a liquid crystal layer.

As shown in FIG. 7, when a voltage is applied to the liquid crystal molecules 1031 located in the first portion of the liquid crystal layer 103, the liquid crystal molecules 1031 located in the first portion of the liquid crystal layer 103 are deflected under the action of the voltage, so that the polarization direction of the linearly polarized light emitted from the second polarizer 1021 is deflected after the linearly polarized light passes through the liquid crystal molecules 1031. In this way, the linearly polarized light deflected by the liquid crystal molecules 1031 is not able to pass through the first polarizers 1011. That is, the liquid crystal molecules 1031 in a portion of the liquid crystal layer 103 corresponding to the first polarizers 1011 are deflected under the action of the voltage, so that the polarization direction of the linearly polarized light emitted from the second polarizer 1021 and passing through the liquid crystal molecules 1031 is deflected, the linearly polarized light whose polarization direction is deflected is not able to pass through the first polarizers 1011. Therefore, in this case, the emergent light of a large angle is blocked by the first polarizers, and the anti-peeping display of narrow viewing angle may be realized.

In the embodiment, the direction of the transmission axis of each of the first polarizers 1011 is the same as the direction of the transmission axis of the second polarizer 1021, and the plurality of first polarizers 1011, the liquid crystal layer 103 and the second polarizer 1021 cooperate with each other, so that the anti-peeping device may be also switched between the state in which the linearly polarized light emitted from the liquid crystal molecules 1031 is allowed to pass through the plurality of first polarizers 1011 and the state in which the linearly polarized light emitted from the liquid crystal molecules 1031 is prevented from passing through the plurality of first polarizers 1011, in response to a deflection state of the liquid crystal molecules 1031. Thus, the anti-peeping device may be switched between the anti-peeping display state of narrow viewing angle and the normal display state of wide viewing angle. Therefore, the anti-peeping device 100 provided by the present embodiment may be easily, accurately, and real-timely switched between the anti-peeping display state of narrow viewing angle and the normal display state of wide viewing angle by controlling the voltage applied to the liquid crystal molecules.

It should be noted that other structures in this embodiment may refer to the foregoing embodiments, and details are not described herein again.

Referring back to FIG. 1, the anti-peeping device 100 may further includes an insulating layer 1012 and a plurality of first electrodes 1013. The insulating layer 1012 is disposed on the first substrate 101 and covers the plurality of first polarizers 1011, and the plurality of first electrodes 1013 is disposed on the insulating layer 1012. For example, an orthogonal projection of the plurality of first electrodes 1013 on the first substrate 101 coincides with an orthogonal projection of the plurality of first polarizers 1011 on the first substrate 101. The anti-peeping device 100 may further include a plurality of second electrodes 1023 located on the second substrate 102. For example, the plurality of second electrodes 1023 may be disposed in such a way that the plurality of second electrodes 1023 correspond to the respective first electrodes 1013, that is, the orthogonal projection of the plurality of first electrodes 1013 on the first substrate 101 coincides with an orthogonal projection of the plurality of second electrodes 1023 on the first substrate 101. The first electrodes 1013 and the second electrodes 1023 are configured to apply a voltage to the liquid crystal molecules 1031 located in the first portion of the liquid crystal layer 103. For example, the first electrode 1013 and the second electrode 1023 may both be transparent conductive films, such as ITO (indium tin oxide).

Figure 8:
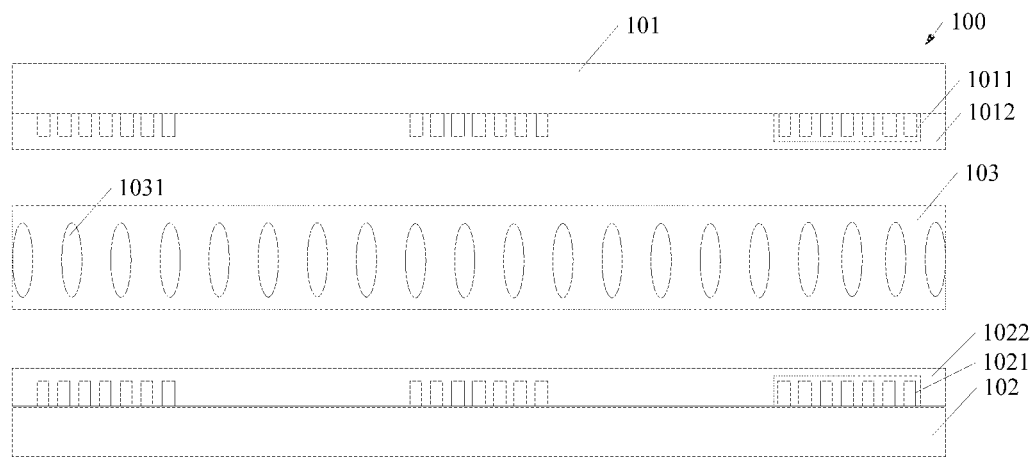
FIG. 8 is a schematic view illustrating an anti-peeping device in which a second polarizer includes wire grid polarizers according to an embodiment of the present disclosure.

As shown in FIG. 8, according to another embodiment of the present disclosure, the second polarizer 1021 may include a plurality of second wire grid polarizers. The anti-peeping device 100 may further include: an insulating layer 1022 disposed on the second substrate 102 and covering the second polarizer 1021. The first polarizers 1011 and the second wire grid polarizers 1021 are further configured to apply a voltage to the liquid crystal molecules 1031 located in the first portion of the liquid crystal layer 103. In this way, it is not necessary to provide the electrodes on the first substrate 101 and the second substrate 102, the metal wire grid polarizers play dual roles of polarizing the light and applying the voltage.

Figure 9:
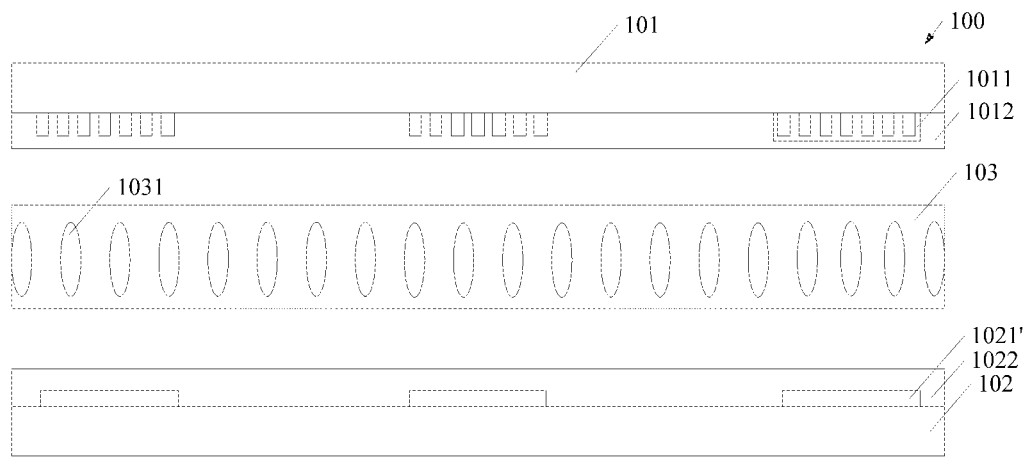
FIG. 9 is a schematic view illustrating an anti-peeping device in which a second polarizer includes patterned polarizers according to an embodiment of the present disclosure.

Alternatively, as shown in FIG. 9, the second polarizer 1021 may include a plurality of second sub-polarizers 1021' which are spaced apart from each other, and the plurality of second polarized sub-polarizers 1021' may be disposed in such a way that the plurality of second sub-polarizers 1021' correspond to the respective first polarizers 1011. That is, an orthogonal projection of the plurality of second sub-polarizers 1021' on the first substrate 101 coincides with the orthogonal projection of the plurality of first polarizers 1011 on the first substrate 101. For example, the second sub-polarizers 1021' may be the same as the first polarizers 1011, that is, the second sub-polarizers 1021' may be metal grid polarizers which are spaced apart from each other or patterned.

Figure 10:
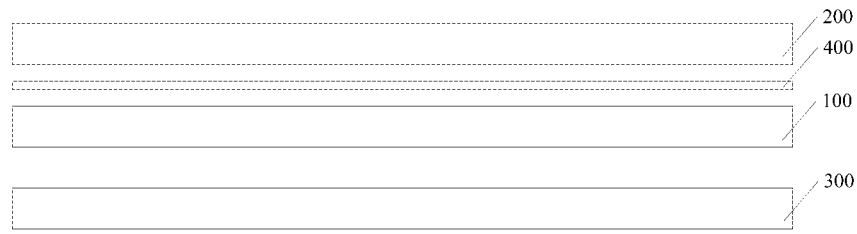
FIG. 10 is a schematic view illustrating a LCD device according to an embodiment of the present disclosure.

As shown in FIG. 10, another embodiment of the present disclosure provides a display device. The display device includes a LCD (liquid crystal display) panel 200 and a backlight 300. The display device further includes an anti-peeping device located between the LCD panel 200 and the backlight 300. It should be understood that the anti-peeping device may be the anti-peeping device 100 according to any of the forgoing embodiments.

In this embodiment, the LCD device provided with the anti-peeping device 100 may be easily, accurately, and real-timely switched between the anti-peeping display state of narrow viewing angle and the normal display state of wide viewing angle by controlling the voltage applied to the liquid crystal molecules in the anti-peeping device 100.

Optionally, the display device may further include a quarter-wave plate 400 between the LCD panel 200 and the anti-peeping device 100. The quarter-wave plate 400 may convert the linearly polarized light passing through the anti-peeping device 100 into a circularly polarized light, so that it is not necessary to limit a direction of a transmission axis of a polarizer in the LCD panel 200 when the anti-peeping device 100 is used.

Figure 11:
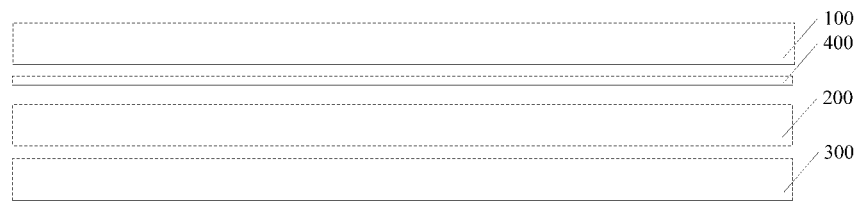
FIG. 11 is a schematic view illustrating a LCD device according to another embodiment of the present disclosure.

As shown in FIG. 11, another embodiment of the present disclosure provides a display device including a liquid crystal display panel 200 and a backlight 300. The display device further includes the anti-peeping device 100, the anti-peeping device 100 is located on a side of the liquid crystal display panel 200 facing away from the backlight 300. In this embodiment, in order to ensure that the linearly polarized light emitted from the liquid crystal display panel 200 is able to enter the anti-peeping device 100, the polarization direction of the linearly polarized light emitted from the liquid crystal display panel 200 may be the same as the direction of the transmission axis of the second polarizer 1021 of the anti-peeping device 100.

Optionally, the display device may further include a quarter-wave plate 400 between the LCD panel 200 and the anti-peeping device 100. The quarter-wave plate 400 may convert the linearly polarized light emitted from the LCD panel 200 into a circularly polarized light, so that it is not necessary to limit the direction of the transmission axis of the second polarizer 1021 of the anti-peeping device 100 to be the same as the polarization direction of the linearly polarized light emitted from the liquid crystal display panel 200.

Figure 12:
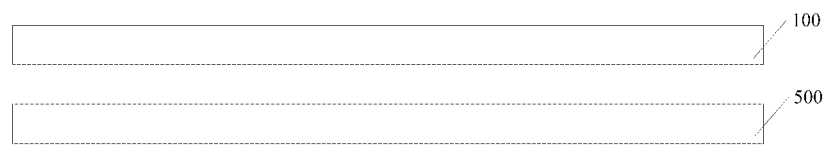
FIG. 12 is a schematic view illustrating an OLED display device according to an embodiment of the present disclosure.

As shown in FIG. 12, another embodiment of the present disclosure provides an OLED (organic light emitting diode) display device including an OLED display panel 500. The OLED display device further includes an anti-peeping device 100 in a light path of light emitted from the OLED display panel 500.

In this embodiment, the OLED display device provided with the anti-peeping device 100 may be easily, accurately, and real-timely switched between the anti-peeping display state of narrow viewing angle and the normal display state of wide viewing angle by controlling the voltage applied to the liquid crystal molecules in the anti-peeping device 100.

Figure 13:
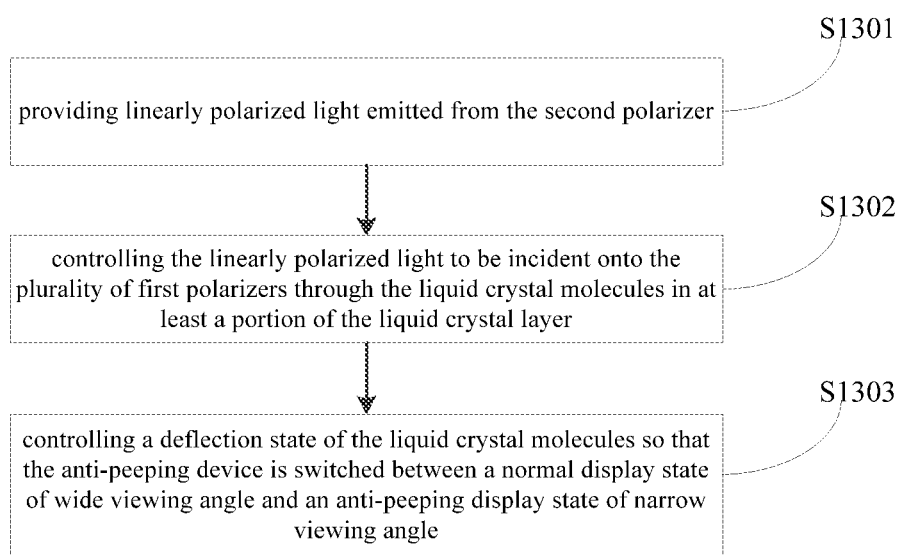
FIG. 13 is a flowchart of a method of controlling an anti-peeping device according to an embodiment of the present disclosure.

According to still another embodiment of the present disclosure, a method of controlling an anti-peeping device is provided. With reference to FIG. 1, the anti-peeping device may include: a plurality of first polarizers 1011 spaced apart from each other; a second polarizer 1021 disposed opposite to the first polarizers 1011; and a liquid crystal layer 103 disposed between the first polarizers 1011 and the second polarizer 1021. As shown in FIG. 13, the method of controlling the anti-peeping device may include: S1301, providing linearly polarized light emitted from the second polarizer 1021; S1302, controlling the linearly polarized light to be incident onto the plurality of first polarizers 1011 through the liquid crystal molecules 1031 in at least a portion of the liquid crystal layer 103; and S1303, controlling a deflection state of the liquid crystal molecules 1031 so that the anti-peeping device is switched between a normal display state of wide viewing angle and an anti-peeping display state of narrow viewing angle.

In the normal display state of wide viewing angle, the linearly polarized light incident onto the plurality of first polarizers is allowed to pass though the plurality of first polarizers 1011. In the anti-peeping display state of narrow viewing angle, the linearly polarized light incident onto the plurality of first polarizers is prevented from passing though the plurality of first polarizers 1011.

For example, the controlling a deflection state of the liquid crystal molecules so that the anti-peeping device is switched between a normal display state of wide viewing angle and an anti-peeping display state of narrow viewing angle may include: applying no voltage to the liquid crystal molecules 1031, that is, controlling the liquid crystal molecules 1031 to be in an undeflected state, so that the linearly polarized light incident onto the plurality of first polarizers through the liquid crystal molecules 1031 is prevented from passing though the plurality of first polarizers 1011, thereby switching the anti-peeping device into the anti-peeping display state of narrow viewing angle; and applying a voltage to the liquid crystal molecules 1031, that is, controlling the liquid crystal molecules 1031 to be in a deflected state under the action of the voltage, so that the linearly polarized light incident onto the plurality of first polarizers through the liquid crystal molecules 1031 is allowed to pass though the plurality of first polarizers 1011, thereby switching the anti-peeping device into the normal display state of wide viewing angle.

Optionally, the controlling a deflection state of the liquid crystal molecules so that the anti-peeping device is switched between a normal display state of wide viewing angle and an anti-peeping display state of narrow viewing angle may include: applying no voltage to the liquid crystal molecules 1031, that is, controlling the liquid crystal molecules 1031 to be in an undeflected state, so that the linearly polarized light incident onto the plurality of first polarizers through the liquid crystal molecules 1031 is allowed to pass though the plurality of first polarizers 1011, thereby switching the anti-peeping device into the normal display state of wide viewing angle; and applying a voltage to the liquid crystal molecules 1031, that is, controlling the liquid crystal molecules 1031 to be in a deflected state under the action of the voltage, so that the linearly polarized light incident onto the plurality of first polarizers through the liquid crystal molecules 1031 is prevented from passing though the plurality of first polarizers 1011, thereby switching the anti-peeping device into the anti-peeping display state of narrow viewing angle.

In the method according to the embodiment of the present disclosure, an easy, accurate, and real-time switch between the anti-peeping display state of narrow viewing angle and the normal display state of wide viewing angle may be realized by controlling the voltage applied to the liquid crystal molecules.

In the descriptions of the present disclosure, it is to be understood that the orientation or positional relationships indicated by the terms "upper", "lower" or the like is based on the orientation or positional relationships shown in the drawings, and is merely for convenience of describing the present disclosure and simplified description, but does not indicate or suggest that the indicated device or element must have a particular orientation, be constructed and operated in a particular orientation, and therefore should not be construed to limit the present disclosure. The terms "mount", "connect", "connecting", "fix" or the like shall be understood in a broad sense unless specifically defined or limited otherwise. For example, they may be fixed connections or detachable connections, or integrated; they may be a mechanical connection or an electrical connection; they may be directly connected or indirectly connected through an intermediary element; or they may be an internal communication of two components or an interaction of two elements. Those skilled in the art may understand the specific meanings of the above terms in the present disclosure according to specific circumstances.

It should also be noted that in the description of the present disclosure, relational terms such as first and second, and the like are only used to distinguish one entity or operation from another entity or operation. It is not necessary to require or imply that any such actual relationship or order exists between these entities or operations. Moreover, the terms "comprise", "include" or any other variations thereof are intended to cover a non-exclusive inclusion, such that a process, method, article, or apparatus which includes a series of elements includes not only those elements but also that are not explicitly listed, or elements that are inherent to such a process, method, article, or device may be included. In the case of no more limitation, the element defined by the sentence "include one . . . " does not exclude that there are other identical elements in the process, the method, the article, or the device.

Obviously, the above embodiments of the present disclosure are merely examples for clearly illustrating the present disclosure, and are not limitations on the implementations of the present disclosure. For those skilled in the art, other variations or changes may be made in various forms based on the above description. All embodiments may not be exhaustively described herein, and any obvious changes or modifications brought forward by the technical solutions according to the present disclosure still fall within the protection scope of the present disclosure.

What is claimed is:

1. An anti-peeping device comprising:
    a first substrate;
    a second substrate opposite to the first substrate;
    a liquid crystal layer between the first substrate and the second substrate;
    a plurality of first polarizers on the first substrate, the plurality of first polarizers being spaced apart from each other; and
    a second polarizer on the second substrate,
    wherein linearly polarized light emitted from the second polarizer is incident onto the plurality of first polarizers through liquid crystal molecules in at least a portion of the liquid crystal layer and, the plurality of first polarizers, the liquid crystal layer and the second polarizer cooperate with each other, so that the anti-peeping device is switched between a first state and a second state in response to a deflection state of the liquid crystal molecules, wherein the linearly polarized light incident onto the plurality of first polarizers through the liquid crystal molecules passes though the plurality of first polarizers in the first state, and the linearly polarized light incident onto the plurality of first polarizers through the liquid crystal molecules is blocked by the plurality of first polarizers in the second state.

2. The anti-peeping device according to claim 1, wherein a direction of a transmission axis of each of the plurality of first polarizers is different from a direction of a transmission axis of the second polarizer.

3. The anti-peeping device according to claim 2, wherein the direction of the transmission axis of each of the plurality of first polarizers is orthogonal to the direction of the transmission axis of the second polarizer.

4. The anti-peeping device according to claim 2, wherein, in a state where the liquid crystal molecules are undeflected, the linearly polarized light incident onto the plurality of first polarizers through the liquid crystal molecules is blocked by the plurality of first polarizers; and
    in a state where the liquid crystal molecules are applied by voltage and deflected, the linearly polarized light incident onto the plurality of first polarizers through the liquid crystal molecules passes though the plurality of first polarizers.

5. The anti-peeping device according to claim 1, wherein a direction of a transmission axis of each of the plurality of first polarizers is the same as a direction of a transmission axis of the second polarizer.

6. The anti-peeping device according to claim 5, wherein, in a state where the liquid crystal molecules are undeflected, the linearly polarized light incident onto the plurality of first polarizers through the liquid crystal molecules passes though the plurality of first polarizers; and
    in a state where the liquid crystal molecules are applied by voltage and deflected, the linearly polarized light incident onto the plurality of first polarizers through the liquid crystal molecules is blocked by the plurality of first polarizers.

7. The anti-peeping device according to claim 1, wherein the first polarizers comprise metal wire grid polarizers.

8. The anti-peeping device according to claim 1, wherein an orthogonal projection of the at least a portion of the liquid crystal layer on the first substrate coincides with an orthogonal projection of the plurality of first polarizers on the first substrate.

9. The anti-peeping device according to claim 1, wherein a width of each one of the plurality of first polarizers in a direction parallel to the first substrate is W, and a distance between the first substrate and the second substrate in a direction perpendicular to the first substrate is d, the width W and the distance d satisfy a following relationship:

$$W > d \times \tan \theta,$$

wherein $\theta$ is a critical angle at which a total reflection occurs at an interface when the linearly polarized light is incident on the first substrate through the liquid crystal molecules.

10. The anti-peeping device according to claim 1, further comprising:
    an insulating layer on the first substrate, the insulating layer covering the plurality of first polarizers;
    a plurality of first electrodes on the insulating layer, an orthogonal projection of the plurality of first electrodes on the first substrate coinciding with an orthogonal projection of the plurality of first polarizers on the first substrate; and
    a plurality of second electrodes on the second substrate, the orthogonal projection of the plurality of first electrodes on the first substrate coinciding with an orthogonal projection of the plurality of second electrodes on the first substrate.

11. The anti-peeping device according to claim 1, wherein the second polarizer comprises a plurality of metal wire grid polarizers.

12. The anti-peeping device according to claim 1, wherein the second polarizer comprises a plurality of second sub-polarizers spaced apart from each other, and an orthogonal projection of the plurality of second sub-polarizers on the first substrate coincides with an orthogonal projection of the plurality of first polarizers on the first substrate.

13. A display device, comprising:
    a backlight source;
    a liquid crystal display panel; and
    the anti-peeping device according to claim 1, on a side of the backlight source facing the liquid crystal display panel.

14. The display device according to claim 13, wherein the anti-peeping device is located between the backlight source and the liquid crystal display panel.

15. The display device according to claim 14, further comprising:
a quarter-wave plate between the liquid crystal display panel and the anti-peeping device.

16. The display device according to claim 13, wherein the anti-peeping device is located on a side of the liquid crystal display panel facing away from the backlight source, a polarization direction of linearly polarized light emitted from the liquid crystal display panel is the same as a direction of a transmission axis of the second polarizer of the anti-peeping device.

17. A display device, comprising:
an OLED display panel, and
the anti-peeping device according to claim 1, in a light path of light emitted from the OLED display panel.

18. A method of controlling an anti-peeping device, the anti-peeping device comprising a plurality of first polarizers spaced apart from each other; a second polarizer opposite to the plurality of first polarizers; and a liquid crystal layer between the plurality of first polarizers and the second polarizer, wherein the method comprises:
providing linearly polarized light emitted from the second polarizer;
controlling the linearly polarized light to be incident onto the plurality of first polarizers through liquid crystal molecules in at least a portion of the liquid crystal layer and; and
controlling a deflection state of the liquid crystal molecules so that the anti-peeping device is switched between a first state and a second state,
wherein in the first state, the linearly polarized light incident onto the plurality of first polarizers through the liquid crystal molecules passes though the plurality of first polarizers, and in the second state, the linearly polarized light incident onto the plurality of first polarizers through the liquid crystal molecules is blocked by the plurality of first polarizers.

19. The method according to claim 18, wherein the controlling a deflection state of the liquid crystal molecules so that the anti-peeping device is switched between a first state and a second state comprises:
controlling the liquid crystal molecules to be in an undeflected state, so that the linearly polarized light incident onto the plurality of first polarizers through the liquid crystal molecules is blocked by the plurality of first polarizers, thereby switching the anti-peeping device into the second state; and
controlling the liquid crystal molecules to be in a deflected state with applied voltage, so that the linearly polarized light incident onto the plurality of first polarizers through the liquid crystal molecules passes though the plurality of first polarizers, thereby switching the anti-peeping device into the first state.

20. The method according to claim 18, wherein the controlling a deflection state of the liquid crystal molecules so that the anti-peeping device is switched between a first state and a second state comprises:
controlling the liquid crystal molecules to be in an undeflected state, so that the linearly polarized light incident onto the plurality of first polarizers through the liquid crystal molecules passes though the plurality of first polarizers, thereby switching the anti-peeping device into the first state; and
controlling the liquid crystal molecules to be in a deflected state with applied voltage, so that the linearly polarized light incident onto the plurality of first polarizers through the liquid crystal molecules is blocked by the plurality of first polarizers, thereby switching the anti-peeping device into the second state.

* * * * *